United States Patent [19]
Shell et al.
[11] 4,286,274
[45] Aug. 25, 1981

[54] INK DROPLET CATCHER ASSEMBLY

[75] Inventors: Ronald G. Shell, Birmingham; Wallace F. Brownell, Northville, both of Mich.; Richard C. Fedder; Kyriakos Christou, both of Longwood, Fla.

[73] Assignee: Burroughs Corporation, Detroit, Mich.

[21] Appl. No.: 127,921

[22] Filed: Mar. 6, 1980

[51] Int. Cl.³ ........ G01D 15/18
[52] U.S. Cl. ........ 346/75; 346/140 R
[58] Field of Search ........ 346/75, 140 IJ

[56] References Cited

U.S. PATENT DOCUMENTS

| | | | |
|---|---|---|---|
| 3,898,673 | 8/1975 | Haskell | 346/75 X |
| 4,060,813 | 11/1977 | Yamada et al. | 346/75 |
| 4,063,253 | 12/1977 | Ito et al. | 346/75 |
| 4,128,841 | 12/1978 | Brown et al. | 346/75 |

*Primary Examiner*—George H. Miller, Jr.
*Attorney, Agent, or Firm*—Charles E. Quarton; Kenneth J. Cooper; Kevin R. Peterson

[57] ABSTRACT

An ink droplet catcher assembly for an ink jet printer includes a housing with an opening for ink droplets. In the housing, a sensor is directly impacted by the ink droplets. The sensor generates varying electrical signals to circuitry controlling ink droplet deflection for an ink jet printer in response to the impact position of the ink droplets on the sensor. A coating is applied to the sensor to retard sensor wear and to prevent short circuiting of the generated electrical signals in response to ink droplet impacts. The housing construction conducts captured ink droplets out of the housing to a reservoir when a lid, covering the housing, deflects air and ink droplets entering the housing.

9 Claims, 4 Drawing Figures

INK DROPLET CATCHER ASSEMBLY

BACKGROUND OF THE INVENTION

1. Field of the Invention

This invention relates to an ink droplet catcher assembly for an ink jet printer.

2. History of the Prior Art

During ink jet printing, ink droplets are selectively deflected to a printing surface to form desired characters. This deflection is controlled by using an energized charging electrode to apply varying electrical charges to the ink droplets. The droplets which are not deflected to the printing surface are captured by an ink droplet catcher assembly.

The patent to Michael Brown, et al entitled "Droplet Microphone," U.S. Pat. No. 4,128,841, issued Dec. 5, 1978, discloses an ink droplet catcher assembly having a housing with an opening through which undeflected ink droplets enter the housing from an ink jet printer. However, unlike ink droplet catchers disclosed in the July, 1972 Technical Disclosure Bulletin of IBM, Volume 15, No. 2; the David E. Lundquist, et al patents entitled "Air Turbulence Control of Inflight Ink Droplets in Non-Impact Recorders," U.S. Pat. No. 3,972,051, issued July 27, 1976, and "Liquid Jet Droplet Generator," U.S. Pat. No. 4,005,435, issued Jan. 25, 1977; and the Richard G. Sweet patent entitled "Fluid Droplet Recorder," U.S. Pat. No. 3,596,275, issued July 27, 1971, which merely collect ink droplets not impacting the printing surface, the "Droplet Microphone" by Brown uses the captured droplets to better deflect subsequent droplets for printing. In the Brown device, nondeflected ink droplets strike an exposed side of a diaphram which has a bimorph sensor affixed to the unexposed side. The bimorph transmits electrical signals to a controller which varies the electrical charges applied to ink droplets by an energized charging electrode. These electrical signals from the bimorph vary according to the position of ink droplet impact on the diaphram. Consequently, the diaphram conducts the impact of the ink droplet to the bimorph and protects the sensor from ink impact and wear. Nevertheless, improvement in the sensor outputs was desired to better control ink droplet deflection.

The applicant's invention improves upon the signal generating ability of the Brown device by eliminating the diaphram and directly exposing the bimorph to the impacts of incoming ink droplets. The bimorph is coated with an electrically nonconductive material so that when the sensor is wetted by impacted droplets, the generated signals are not short circuited. In addition, the exposed bimorph is protected by angular plates of rigid material secured to the lid of the catcher housing. These plates are positioned between the bimorph and the housing droplet opening and spaced apart a certain distance to intercept objects larger than a predetermined size. As a result, the bimorph is protected while the housing droplet opening remains large to capture ink droplets of varying trajectories and to limit ink spillage.

SUMMARY OF THE INVENTION

An ink droplet catcher assembly for an ink jet printer has a housing with an opening for ink droplets and a sensor within the housing which is directly impacted by the droplets. The sensor is a bimorph and generates varying electrical signals to circuitry controlling ink droplet deflection for an ink jet printer in response to the impact position of the ink droplets on the bimorph. In addition, the bimorph has an electrically nonconductive coating to retard sensor wear and to prevent short circuiting of the generated electrical signals in response to ink droplet impacts.

The size of objects which contact the bimorph is limited by angular plates of rigid material secured to a lid which covers the housing. The plates are positioned between the bimorph and the housing droplet opening and are spaced apart a distance to intercept objects larger than a predetermined size.

Captured ink droplets are conducted out of the housing to a reservoir by the cooperation of a funnel, drain tube, and an air intake port in the housing. The funnel channels captured ink droplets into a drain tube which encloses the funnel. The air intake port conducts air around the funnel to create a suction force through the drain tube, collect the ink droplets from the funnel, and transmit them to the reservoir.

A lid covers the housing, is electrically connected to the bimorph, and deflects the air and ink droplets for conduction out of the housing to a reservoir.

DETAILED DESCRIPTION OF THE INVENTION

In a system involving ink jet printing, quality characters result by controlling the path of ink droplets from an ink jet to a printing surface. However, some of the ink emitted from an ink jet does not reach the printing surface, but is merely caught and recycled to the ink jet.

To increase the control over ink droplet deflections and improve character printing, an ink droplet catcher assembly has been developed which generates electrical signals to circuitry controlling ink droplet deflection in response to the impact position of ink droplets directly on a sensor. These signals are then used to adjust the energization of the charging electrode which charges the ink droplets and controls the path of those droplets to the printing surface. When the proper charges are applied to the droplets, quality character printing is achieved.

Figure 1:
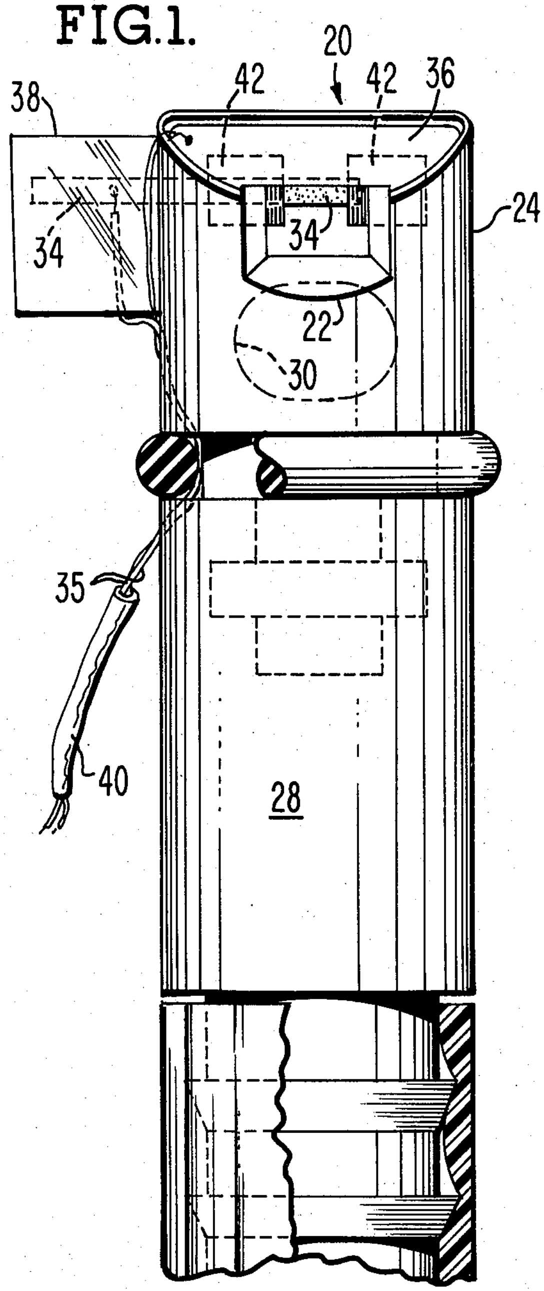
FIG. 1 is a partial sectional front view of the ink droplet catcher assembly.
Figure 2:
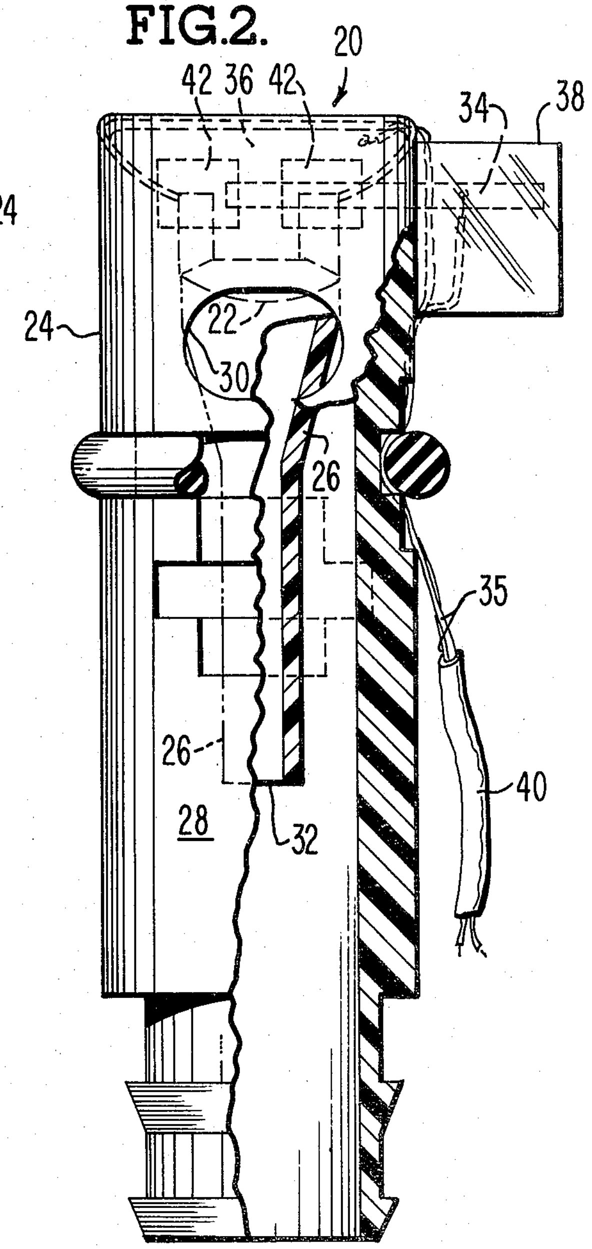
FIG. 2 is a partial sectional rear view of the ink droplet catcher assembly.
Figure 3:
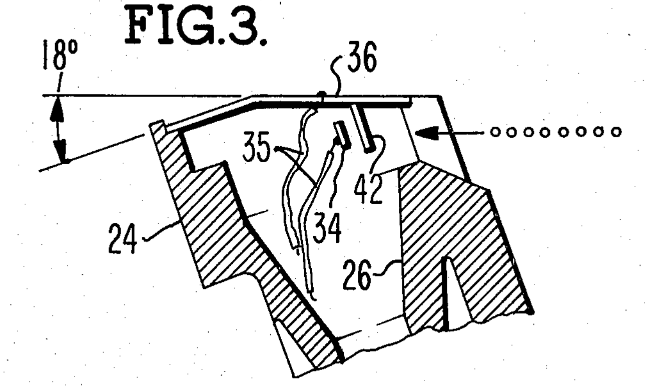
FIG. 3 is a sectional side view of FIG. 1.
Figure 4:
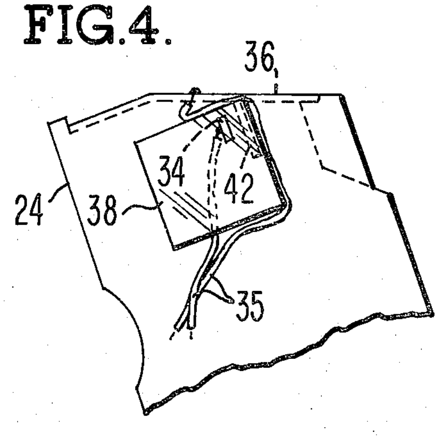
FIG. 4 is a side view of FIG. 1 with the sensor partially broken away.

All ink droplets emitted by an ink jet are not deflected to the printing surface. The undeflected droplets are captured by an ink droplet catcher assembly 20 (FIG. 1) having an entrance 22 in a housing 24, channelled by funnel 26 (FIG. 2), and emptied into an ink reservoir (not shown) through drain tube 28. To increase the ease with which funnel 26 empties its channelled ink into drain tube 28, an air intake port 30 is located in housing 24 opposite entrance 22 (FIG. 1) which permits air to flow around funnel 26 (FIG. 2) and across the lower exit 32 of the funnel to create a desired suction force.

The electrical signals used by control circuitry to vary the deflection of ink droplets to the printing surface are generated by the ink droplets impinging upon a bimorph 34 positioned within the catcher assembly 20.

Bimorph 34 is constructed with two strips of piezoelectric materials connected together with a wire 35 fixed to each strip to transmit generated electrical signals to the ink droplet deflection control circuitry. Also, the bimorph is coated with an electrically nonconductive material. This coating prevents the short circuiting of generated signals between the piezoelectric strips when ink droplets impact and wet the outer surfaces of the bimorph 34.

To cover the ink droplet catcher assembly 20, contribute to the protection of bimorph 34 from a hostile working environment, and aid in the conduction of air and channelling of captured ink droplets into funnel 26, a metallic lid 36 is cemented onto the housing 24 and may be electrically connected to one piezoelectric strip of bimorph 34 for common electrical grounding purposes.

The end of bimorph 34 having the attached signal transmitting wires 35 is imbedded in a casted, epoxy-like plastic 38. This mass has the unimbedded portion of the signal transmitting wires 35 extending along the catcher assembly 20 within cable 40 to the ink droplet deflection control circuitry. The casted plastic 38 is then cemented to the exterior of housing 24 with a length of bimorph 34 poised as a cantilever within housing 24 and across entrance 22.

To limit the size of objects which may contact the exposed bimorph 34, metallic projections 42 having a lip are secured to the lid 36. The projections 42 are plates of metal positioned between the bimorph 34 and the entrance 22 of the housing 24. These plates are also spaced apart a distance to intercept objects larger than a predetermined size. Consequently, when a foreign object having a diameter greater than the spaced distance between projections 42 is inserted into entrance 22, the foreign object will contact projections 42 and fail to damage bimorph 34. By protecting the bimorph 34 with projections 42 as described, the entrance 22 of housing 24 may remain large to capture varying trajectories of ink droplets and limit ink spillage.

What is claimed is:

1. An ink droplet catcher assembly for an ink jet printer comprising:

a housing having an opening for receiving ink droplets;

a sensor, aligned within the housing to be directly impacted by the ink droplets, the sensor generating varying electrical signals for supply to circuitry controlling ink droplet deflection for an ink jet printer in response to the impact position of the ink droplets on the sensor;

a coating on the sensor to retard sensor wear and to prevent short circuiting of the generated electrical signals in response to ink droplet impacts;

means, within the housing, for limiting the size of objects which contact the sensor;

means for conducting the ink droplets out of the housing to a reservoir; and a lid, covering the housing, to deflect air and ink droplets into the means for conducting the ink droplets out of the housing.

2. The invention of claim 1, wherein the sensor, aligned within the housing to be directly impacted by the ink droplets comprises a bimorph.

3. The invention of claim 1, wherein the coating on the sensor comprises an electrically nonconductive material.

4. The invention of claim 1, wherein the lid is electrically connected to the sensor.

5. The invention of claim 1, wherein the means, within the housing, for limiting the size of objects which contact the sensor comprises projections positioned between the sensor and the housing ink droplet opening, the projections being spaced apart a distance to intercept objects larger than a predetermined size.

6. The invention of claim 5, wherein the projections comprise plates of rigid material having a lip secured to the lid.

7. The invention of claim 1, wherein the means for conducting ink droplets out of the housing to a reservoir comprises:

a funnel to channel captured ink droplets;

a drain tube, enclosing the funnel, into which the ink droplets are channelled; and means for transmitting a suction force through the drain tube to collect the ink droplets from the funnel and to transmit them to the reservoir.

8. The invention of claim 7, wherein the means for transmitting a suction force through the drain tube comprises means for conducting air around the funnel to create the suction force.

9. The invention of claim 8, wherein the means for conducting air around the funnel to create the suction force comprises a housing having an air intake port.

* * * * *